United States Patent
Roth et al.

(10) Patent No.: US 7,100,033 B2
(45) Date of Patent: Aug. 29, 2006

(54) CONTROLLING THE TIMING OF TEST MODES IN A MULTIPLE PROCESSOR SYSTEM

(75) Inventors: Charles P. Roth, Austin, TX (US); Minesh S. Desai, Chandler, AZ (US); Gerold Mueller, Ulm (DE); Peter Lachner, Heroldstatt (DE)

(73) Assignee: Intel Corporation, Santa Clara, CA (US)

( * ) Notice: Subject to any disclaimer, the term of this patent is extended or adjusted under 35 U.S.C. 154(b) by 409 days.

(21) Appl. No.: 10/278,400

(22) Filed: Oct. 23, 2002

(65) Prior Publication Data

US 2004/0083072 A1  Apr. 29, 2004

(51) Int. Cl.
*G06F 11/30* (2006.01)
(52) U.S. Cl. .............................. 713/1; 714/30; 714/34; 714/35; 709/227; 709/229
(58) Field of Classification Search .................... 713/1; 714/30, 34, 35; 709/227, 229
See application file for complete search history.

(56) References Cited

U.S. PATENT DOCUMENTS

| 6,101,598 | A * | 8/2000 | Dokic et al. ................. 712/227 |
| 6,430,705 | B1 * | 8/2002 | Wisor et al. ................... 714/30 |
| 6,587,995 | B1 * | 7/2003 | Duboc et al. ................... 716/4 |
| 6,681,341 | B1 * | 1/2004 | Fredenburg et al. ........... 714/30 |
| 6,718,294 | B1 * | 4/2004 | Bortfeld ....................... 703/20 |
| 6,857,084 | B1 * | 2/2005 | Giles ........................... 714/35 |
| 6,865,693 | B1 * | 3/2005 | McAfee ....................... 714/27 |

* cited by examiner

*Primary Examiner*—A. Elamin
(74) *Attorney, Agent, or Firm*—Ling Hong

(57) ABSTRACT

A system includes a first processor, a second processor and a circuit. The first processor includes a first terminal and enters a first test mode in response to the first terminal having a first signal state. The second processor includes a second terminal. The second processor enters a second test mode in response to the second terminal having a second signal state. The circuit may regulate the timing of the first and second signal states to place both the first processor in the first test mode and the second processor in the second test mode at approximately the same time. The circuit may regulate the timing of the signals to cause the first and second processors to resume normal modes of operation at approximately the same time.

15 Claims, 3 Drawing Sheets

CONTROLLING THE TIMING OF TEST MODES IN A MULTIPLE PROCESSOR SYSTEM

BACKGROUND

The invention generally relates to controlling the timing of test modes in a multiple processor system.

A circuit typically undergoes a debugging process for purposes of finding errors, or "bugs," in the operation of the circuit and correcting these bugs. As an example, the circuit may be a microprocessor, and debugging the microprocessor may involve placing the microprocessor in a debug, or test mode to prevent the microprocessor's execution unit(s) from prefetching and decoding instructions. In this manner, when the microprocessor is in this mode, external circuitry may control the execution unit(s) of the microprocessor and examine the various states of registers of the microprocessor. This ability to observe and control the microprocessor's states facilitates the design and evaluation of a system that incorporates the microprocessor.

Some systems may include multiple microprocessors. In such a system, placing one microprocessor in a test mode may not be beneficial because the other microprocessors and other processing elements of the system continue to operate. Therefore, a precise evaluation of the system and/or the particular microprocessor that is in the test mode may be hindered due to the operations of the other microprocessor(s) and other processing elements of the system.

Thus, a multiple processor system presents challenges relating to debugging such a system. Therefore, there is a continuing need for better ways to debug a multiple processor system.

DETAILED DESCRIPTION

Figure 1:
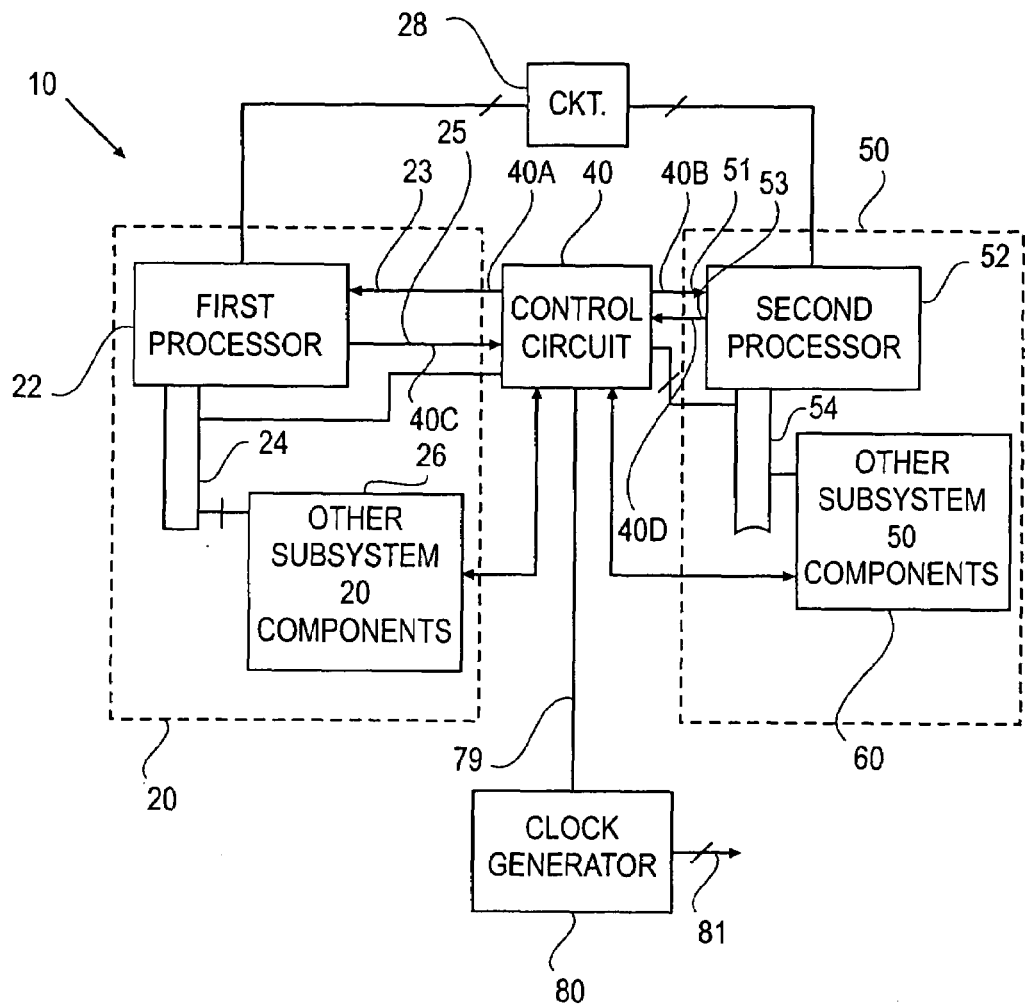
FIG. 1 is a block diagram of a system according to an embodiment of the invention.

Referring to FIG. 1, an embodiment of a system 10 in accordance with the invention includes a first processor-based subsystem 20 and a second processor-based subsystem 50. More particularly, the first processor-based subsystem 20 includes a first processor 22 and possibly other subsystem components 26 that operate within the same processing system as the first processor 22. These other subsystem components 26 are generally connected to the operation of the first processor 22 and communicate with the first processor 22 over a bus 24. As an example, the subsystem components 26 may include a memory that is accessed by the first processor 22, as well as various peripheral devices that interact with the first processor 22. These peripheral devices may include, for example, a display device interface, keyboard, a mouse, a serial bus interface, etc.

The first processor 22 may be any processing element, such as a microprocessor, for example. As another example, the first processor 22 may be a memory controller. The first processor 22 may be another type of processing element, in other embodiments of the invention. Regardless of the type of processing element, the first processor 22 is capable of entering a test mode and is capable of resuming a normal mode of operation from this test mode.

In the context of this application the phrase "test mode" refers to an emulation or debugging mode in which the processor may be controlled and evaluated by via circuitry 28 that is external to the processor. Furthermore, during this test mode, the external circuitry 28 may be used to evaluate, modify and examine various states of the first processor 22. In the context of this application, the phrase "normal mode" refers to mode of operation other than a test mode.

The first processor 22 may be controlled and/or evaluated by software debugging application programs in some embodiments of the invention. This software control/evaluation may be separate from or in conjunction with the circuitry 28, depending on the particular embodiment of the invention.

Other variations for controlling the test mode are possible. For example, in some embodiments of the invention, the circuitry 28 may be integrated into the same die as the first processor 22. In some embodiments of the invention, the circuitry 28 may be fabricated on a different die than the die in which the first processor 22 is fabricated. In some embodiments of the invention, the circuitry 28 may be part of the same semiconductor package as the first processor 22. In other embodiments of the invention, the circuitry 28 and first processor 22 may be part of different semiconductor packages.

The second processor-based subsystem 50 includes a second processor 52 and possibly other subsystem components 60 that operate within the same processing system as the second processor 52. These components 60 are generally connected to the operation of the second processor 52 and communicate with the second processor 52 over a bus 54.

Similar to the first processor 22, the second processor 52 may be any processing element, such as a microprocessor or a memory controller, as examples. The second processor 52 is also capable of entering a test mode, a mode in which the second processor 52 may be controlled and evaluated via external circuitry 28. Furthermore, during the test mode, the external circuitry 28 may be used to evaluate, modify and examine various states of the second processor 52. The second processor 52 is also capable of resuming a normal mode of operation from this test mode.

Similar to the first processor 22, the second processor 52 may be controlled and/or evaluated by software debugging application programs, in some embodiments of the invention. This software control/evaluation may be separate from or in conjunction with the circuitry 28, depending on the particular embodiment of the invention. In some embodiments of the invention, the circuitry 28 may be integrated into the same die as the second processor 52. In some embodiments of the invention, the circuitry 28 may be fabricated on a different die than the die in which the second processor 52 is fabricated. In some embodiments of the invention, the circuitry 28 may be part of the same semiconductor package as the second processor 52. In other embodiments of the invention, the circuitry 28 and second processor 52 may be part of different semiconductor packages. In some embodiments of the invention, the first 22 and second 52 processors and the circuitry 28 are all fabricated on the same die, and in some embodiments of the invention, the first 22 and second 52 processors and the circuitry 28 are part of the same semiconductor package. Other variations are possible.

Like the subsystem components 26 of the first subsystem 20, the subsystem component 60 of the second subsystem 50 may include a memory that is accessed by the second processor 52, as well as various peripheral devices that interact with the second processor 52.

For purposes of debugging the system 10, in some embodiments of the invention, the system 10 includes a control circuit 40 that initiates each processor's entry into and exit from its test mode. The control circuit 40 ensures that both processors 22 and 52 enter their respective test modes at approximately the same time in some embodiments of the invention. In some embodiments of the invention, the control circuit 40 ensures that both processors 22 and 52 resume normal operations (i.e., operations outside of any test mode) at approximately the same time.

As a more specific example, in some embodiments of the invention, the first 22 and/or second 52 processor may be a microprocessor that enters a dormant state in response to being placed in its respective test mode. In this manner, the microprocessor may stop decoding and prefetching instructions in response to being placed in the test mode, and during the test mode, the external circuitry 28 may use dedicated input and output terminals (e.g., a dedicated or shared port) of the microprocessor to perform various test and evaluation-related functions. It is through these terminals that the external circuitry 28 may effectively bypass the decode unit of the microprocessor to control the execution unit(s) of the microprocessor. Furthermore, during the test mode, the external circuitry 28 may examine and modify various internal registers of the microprocessor.

Similar operations may be performed during the test mode for the case where the first or second processor is not a microprocessor. For example, in embodiments of the invention in which the first or second processor is a memory controller, the control circuitry of the memory controller enters a dormant state, a state in which the control circuitry of the memory controller is controlled by the circuitry 28. Furthermore, in the test mode, the circuitry 28 may be used to examine and modify various internal registers of the memory controller.

Regardless of the specific embodiment of the first 22 or second 52 processor, the control circuit 40 generates signals on input terminals 23 and 51 of the processors 22 and 52, respectively, for purposes of causing either (1) both processors 22 and 52 to enter their respective test modes at approximately the same time; or (2) both processors 22 and 52 to resume their normal operations at approximately the same time. In the context of this application, "terminal" is not limited to an external pin or the pin of a semiconductor package, although "terminal" does include such pins. As described below, any component (including the first 22 and second processor 52) of the subsystems 20 and 50 may trigger the control circuit's generation of these signals (i.e., trigger the control circuit's initiation of the test modes or initiation of the resumption of the normal modes of operation) in some embodiments of the invention.

The control circuit 40 includes an output terminal 40a that is coupled to the input terminal 23 of the first processor 22 and another output terminal 40b that is coupled to the input terminal 51 of the second processor 52. The control circuit 40 is programmable so that the output terminals 40a and 40b of the circuit 40 may be selectively disabled, as described below, for purposes of preventing a particular processor 22 or 52 from entering the test mode or resuming a normal mode of operation in response to a signal that is provided by the control circuit 40. The output terminals 40a and 40b are assumed enabled for purposes of simplifying the description of the control circuit 40, unless otherwise noted below.

The control circuit 40 also includes an input terminal 40c that is coupled to an output terminal 25 of the first processor 22, and the control circuit 40 includes another input terminal 40d that is coupled to an output terminal 53 of the second processor 52. The circuit 40 is programmable so that the input terminals 40c and 40d may be selectively disabled, as described below, for purposes of preventing a particular processor 22 or 52 from triggering the test mode in the other processor or triggering the resumption of the normal mode of the other processor. The input terminals 40c and 40d are assumed enabled for purposes of simplifying the description of the control circuit 40, unless otherwise noted below.

In some embodiments of the invention, the first processor 22 enters its test mode operation in response to entering a predetermined signal state (called a "test mode signal state" herein) on its input terminal 23, and similarly, the second processor 52 enters the test mode in response to entering the test mode signal state on its input terminal 51. As an example, the test mode signal state may be a logic one state, in some embodiments of the invention. In some embodiments of the invention, the first processor 22 enters a normal mode of operation in response to entering a predetermined signal state (called a "normal mode signal state" herein) on its input terminal 23, and similarly, the second processor 52 enters a normal mode of operation in response to providing the normal mode signal state on its input terminal 51. The entity that generates the test/normal mode signal states may reside on the same die as the first processor, on the same die as the second processor or a die that is separate from the first and second processors, depending on the particular embodiment of the invention.

As just a few examples, this entity may generate the test/normal mode signal states in response to a number of different events such as a snooping event or the decoding of a particular bus address. For example, the entity may be an LCD controller that detects a certain video frame and generates the test/normal mode signal state in response to this detection. As another example, the entity may be a dedicated hardware trace buffer that generates the test/normal mode signal state in response to a particular address. Other entities that generate the test/normal mode signal state in response to addresses, control events, etc. are within the scope of the appended claims.

The entity that triggers the test mode or resumption of a normal mode of operation may be one of the components 26 or 60. Furthermore, not only may one of the components 26 or 60 trigger the test mode or resumption of the normal mode of operation, one of more of the components may be controlled in response to the control circuit 40 triggering the test mode or resumption of the normal mode of operation in the first 22 and second 52 processors. For example, in some embodiments of the invention, one of the components 22 or 60 may be a direct memory access (DMA) controller. Continuing with the example, the control circuit 40 may initiate the test modes in the first 22 and second 52 processors and concurrently stop operation of the DMA controller until the first 22 and second 52 processors resume to their normal modes of operation.

As described below, the circuit 40 (via the output terminals 40a and 40b) establishes the test mode signal state on each of the input terminals 23 and 51 concurrently, in some embodiments of the invention, for purposes of placing both processors 22 and 52 into their respective test modes at approximately the same time.

In some embodiments of the invention, a particular processor 22 or 52 may enter the test mode after a predetermined number (one to four, for example) of clock cycles elapse from when the signal at the respective input terminal 23 or 51 transitions to the test mode signal state. As an example, in some embodiments of the invention, although the circuit 40 establishes the test mode signal states on the input terminals 23 and 51 concurrently, the processors 22 and 52 enter their respective test modes within a few clock cycles of each other. However, entering the respective test modes within a relatively few (one to one hundred, as an example) clock cycles is deemed to be entering the test modes at "approximately at the same time" in the context of this application.

Similarly, although the circuit 40 may establish normal mode states on the input terminals 23 and 51 concurrently, the processors 22 and 52 enter their normal modes of operation within a few clock cycles of each other. However, entering the respective normal modes of operation within a relatively few (one to one hundred, as an example) clock cycles is deemed to be entering the normal modes at "approximately at the same time" in the context of this application The techniques and circuitry that are described herein to place both processors 22 and 52 in their respective test modes or resume to normal operations at approximately the same time may provide one or more of the following advantages: the starting and stopping of peripherals may be programmable; the triggers for entering debug/emulation modes may be programmable; multiple sources (processors, peripherals, performance monitors, bus watchers, etc.) may trigger the test modes; software may be used to trigger debug/emulation modes; the technique provides an expandable architecture to more cores or peripherals; the technique provides the source of the trigger; and the technique is transparent to the system. Other and different advantages are possible in other embodiments of the invention.

For purposes of permitting the first 22 and second 52 processors to trigger the test mode or the resumption of normal operation in the other processor, in some embodiments of the invention, the first 22 and second 52 processors establish the appropriate signal states on their output terminals 25 and 53. In this manner, by establishing the appropriate signal state on either one of these output terminals, the first 22 or second 52 processor may trigger the control circuit's initiation of the test mode for the other processor. More specifically, in response to either output terminal 25 or 53 indicating the appropriate signal state, the circuit 40 simultaneously generates the test mode signal states on the input terminals 23 and 51 to ensure both processors 22 and 52 enter their respective test modes.

In some embodiments of the invention, concurrent with the generation of the signals on the input terminals 23 and 51, the circuit 40 generates a signal on a control line 79 to stop a clock generator 80, a circuit that supplies clock signals (via clock lines 81) to various components of the subsystems 20 and 50.

Figure 2:
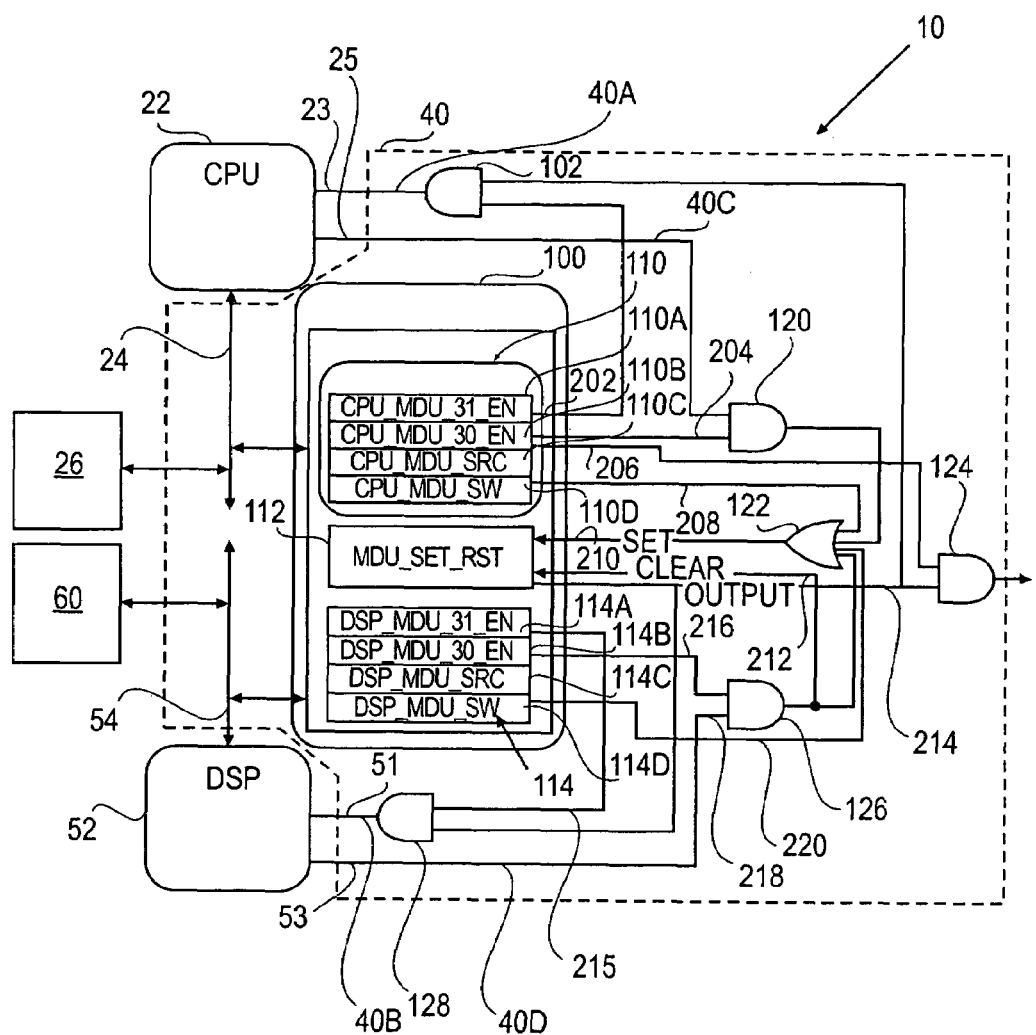
FIG. 2 is a more detailed schematic diagram of the system depicted in FIG. 1.

FIG. 2 depicts a more detailed schematic diagram of the system 10 according to some embodiments of the invention. In these embodiments of the invention, the first processor 22 may be a central processing unit (CPU), and the second processor 52 may be a digital signal processor (DSP) 52. In some embodiments of the invention, the first processor 22, the second processor 52 and the circuit 40 may be located in the same integrated package, and in some embodiments of the invention, the first processor 22, the second processor 52 and the circuit 40 may be fabricated on the same die. Other variations are possible.

Referring to FIG. 2, in some embodiments of the invention, the circuit 40 includes registers 100 that provide a programmable structure for controlling the entry and exit of the test modes. As described below, these registers 100 may be used for purposes of initiating the test modes of the processors; initiating normal non-test modes of the processors; selectively enabling/disabling the output terminals 40a and 40b of the control circuit 40; and selectively enabling/disabling the input terminals 40c and 40d of the control circuit 40.

More specifically, in some embodiments of the invention, the registers 100 include registers 110 (such as registers 110a, 110b, 110c and 110d, as examples) that are read from/written to by the first processor 22 and possibly other components of the subsystem 20 via the bus 24. The registers 100 also include registers 114 (such as registers 114a, 114b, 114c and 114d, as examples) that are read from/written to by the second processor 22 via the bus 54. The registers 100 also include a readable register 112 whose bit states are controlled by the circuit 40 to start and stop the test modes, as described below. As also described below, the registers 100 and associated circuitry of the circuit 40 provide the capability to put both processors 22 and 52 in their respective test modes at approximately the same time. The registers 100 and associated circuitry of the control circuit 40 also provide the capability for the processors 22 and 52 to exit their respective test modes at approximately the same time.

In some embodiments of the invention, the first 22 and second 52 processors are each capable of asynchronously entering their respective test modes or resuming normal operations in response to the appearance of the test mode signal state on their input terminals 23 and 51, respectively. For purposes of simplifying the description below, it is assumed that a particular processor 22 or 52 enters its test mode in response to its input terminal 23 or 51 being asserted (driven high, for example). However, another signal state may be used (not necessarily the same signal state for each input terminal) to trigger the test mode for a particular processor. Each processor 22, 52 is also capable of entering their respective test modes and resuming normal operations in response to internal events.

The control circuit's output terminals 40a and 40b are selectively enabled/disabled (and thus, the input terminals 23 and 51 are selectively enabled/disabled) via the data that is stored in registers 110a and 114a, respectively. In this manner, software-initiated write operations to registers 110a and 114a may be used to selectively enable/disable the output terminals 40a and 40b.

More specifically, in some embodiments of the invention, the register 110a includes a bit that indicates (via an output terminal 202) whether the output terminal 40a is enabled. For example, a bit value indicative of logic one may be used to enable the circuit 40 to assert the input terminal 23, and a bit value of logic zero may be used to disable the circuit 40 from asserting the input terminal 23. Similarly, the register 114a includes a bit that indicates (via its output terminal 215) whether the circuit 40 is enabled to assert the input terminal 51 of the second processor 52.

For purposes of selectively enabling/disabling the input terminals 40c and 40d (and thus, selectively enabling/disabling the output terminals 25 and 53) the registers 110 include registers 110b and 114b, in some embodiments of the invention. As an example, the register 110b may include a bit (associated with an output terminal 204) to selectively enable/disable the output terminal 25. In some embodiments of the invention, the register 110b includes a second bit (associated with an output terminal 206) to selectively enable the control circuit's ability (via the output terminal 25) to disable the clock generator 80 (see FIG. 1). As examples, a bit value indicative of a logic one for the bit that is associated with the output terminal 204 may be used to enable the first processor 22 to trigger the test mode in the second processor 52 via the assertion of the output terminal 25; and a bit value indicative of a logic one for the bit that is associated with the output terminal 206 may be used to enable the control circuit's ability to disable the clock generator 80.

The register 114b includes at least one bit (associated with an output terminal 216) to selectively enable the output terminal 53. As an example, a bit value indicative of a logic one for this bit may be used to enable the second processor 52 to trigger the test mode in the first processor 22 via the assertion of the output terminal 53.

Not only may the first 22 and second 52 processors trigger the test modes, other components of the subsystems 26 and 60 may trigger the test modes as well. Therefore, the registers 110b and 114b may include other bits for selectively enabling/disabling the ability of various other components to trigger the test modes and disable the clock generator 80. Thus, in some embodiments of the invention, other bits of the register 110b may be associated with other components of the subsystem 20, and other bits of the register 114b may be associated with other components of the subsystem 50.

The triggering of the test modes may be initiated via a software-initiated write operation to a bit of the register 110d. In this manner, a component of the subsystem 20 may update the register 110d to establish a bit value (a logic one value, for example) that appears on a bit output terminal 208 of the register 110d and causes the circuit 40 to initiate the test modes. For purposes of indicating the source of the trigger, a register 110c includes bits that are updated or cause to be updated by the component (of the subsystem 20) that initiates the triggering of the test modes. For components of the subsystem 50, the triggering of the test modes may also be initiated via a software-initiated write operation to a bit of the register 114d. In this manner, a component of the subsystem 50 may update the register 114d to establish a bit value (a logic one value, for example) that appears on a bit output terminal 220 of the register 114d and causes the circuit 40 to initiate the test modes. The register 114c includes bits that are updated or caused to be updated by the component (of the subsystem 50) that initiates the triggering of the test modes for purposes of indicating the source of the trigger.

Thus, various sources may trigger the initiation of the test modes by the circuit 40, as a particular trigger signal may be generated by either processor, a bit of the registers 100 or another component of either subsystem 20 or 50. In some embodiments of the invention, the circuit 40 includes an OR gate 122, or a logical equivalent thereto, that logically ORs together potential trigger signals.

In this manner, in some embodiments of the invention, an input terminal of the OR gate 122 is coupled to the output terminal 208 of the register 110d; another input terminal of the OR gate 122 is coupled to the output terminal of an AND gate 120, or a logical equivalent thereto; another input terminal of the OR gate 122 is coupled to the output terminal 220 of the register 114d; and another input terminal of the OR gate 122 is coupled to the output terminal of an AND gate 126, or a logical equivalent thereto.

An input terminal of the AND gate 120 is coupled to the output terminal 25 of the first processor 22, and another input terminal of the AND gate 120 is coupled to the output terminal 204 of the register 110b. Thus, the AND gate 120 controls whether the output terminal 25 of the first processor 22 is enabled for purposes of triggering the initiation of the test modes in response to the bit valve that is indicated by the output terminal 204. Similarly, an input terminal of the AND gate 126 is coupled to the output terminal 53 of the second processor 52, and another input terminal of the AND gate 126 is coupled to the output terminal 216 of the register 114b. Thus, the AND gate 126 controls whether the output terminal 53 of the second processor 52 is enabled for purposes of triggering the initiation of the test modes in response to the bit value that is indicated by the output terminal 216.

Thus, the output terminal of the OR gate 122 provides a signal whose logical state indicates whether the test modes should be/are initiated. In this manner, in some embodiments of the invention, the signal that is provided by the output terminal of the OR gate 122 is asserted (driven high, for example) for purposes of initiating the test modes.

The output terminal of the OR gate 122 is coupled to a set input terminal 210 of the register 112. In this manner, in some embodiments of the invention, the signal on the output terminal 210 controls when a particular bit of the register 112 has a logic one value. This logic one value, in turn, causes the circuit 40 to ensure both the first 22 and second 52 processors are placed in their respective test modes, assuming that the first 22 and second 52 processors are enabled to respond to this bit by the registers 110a and 114a, respectively. Conversely, in some embodiments of the invention, a logic zero value for the bit cause the circuit 40 to place the first 22 and second 52 processors in their normal modes of operation, assuming that the first 22 and second 52 processors are enabled to respond to this bit by the registers 110a and 114a, respectively.

Although a logic zero-to-one transition of the output signal of the OR gate 122 may be used to set the bit in the register 112, the clearing of the bit is controlled by the output terminal 53 of the second processor 52. Thus, assuming that the output terminal 53 has been enabled by the appropriate bit in the register 114b, the signal provided by the output terminal 53 controls when the bit in the register 112 is cleared, i.e., controls when the first 22 and second 52 processors exit their test modes. Other techniques may be used to clear the bits.

In some embodiments of the invention, the logic one to logic zero transition of the signal on the output terminal 53 controls the clearing of the bit in the register 112. Thus, in some embodiments of the invention, the only trigger to exit the test modes is controlled by the second processor 52.

Among the other circuitry of the circuit 40, the control circuit 40 includes an AND gate 102 that controls enabling the output terminal 40a (and input terminal 23). In this manner, an input terminal of the AND gate 102 is coupled to the output terminal 214 of the register 112, and another input terminal of the AND gate 102 is coupled to the output terminal 202 of register 110a. The output terminal of the AND gate 102 serves as the output terminal 40a.

The control circuit 40 also includes an AND gate 128 that controls enabling the output terminal 40b (and thus, the input terminal 53). In this manner, an input terminal of the AND gate 128 is coupled to the output terminal of the register 112, and another input terminal of the AND gate 102 is coupled to the output terminal of register 114a.

In some embodiments of the invention, if software that is executed by the second processor 52 desires to trigger the test modes, the second processor 52 may do so by enabling the correct bit in the register 114b and executing a predefined software instruction to cause the assertion of its output terminal 53. In some instances, software may want to trigger the test mode of the first processor 22 from the second processor 52 but not necessarily put the second processor 52 in the test mode. This may be accomplished by the software causing the second processor 52 to set to the appropriate bit of the register 114d. If software from the first processor 22 desires to trigger the test mode in the second processor 52 it can do so by setting the appropriate bit in the register 110d.

Figure 3:
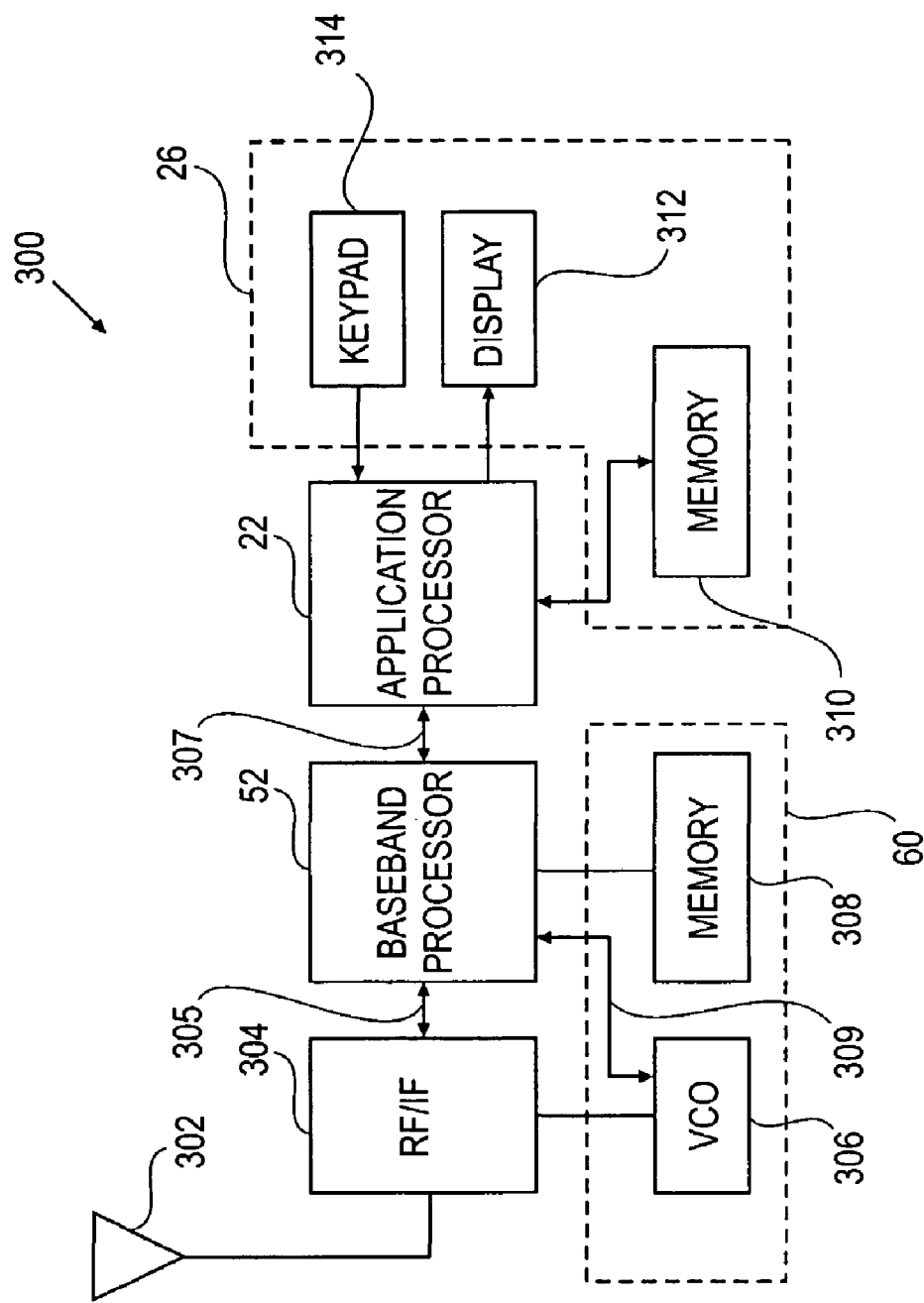
FIG. 3 is a block diagram of a cellular telephone according to an embodiment of the invention.

Referring to FIG. 3, in some embodiments of the invention, the first 22 and second 52 processors may form part of a cellular telephone 300. In this manner, the first processor 22 may form the application processor of the cellular telephone, and the second processor 52 may form a baseband processor for the cellular telephone 300.

More specifically, the cellular telephone 300 may include an antenna 302 (a dipole antenna, for example) that is coupled to a radio frequency interface 304. The cellular telephone 300 may be in accordance with any of the available communications standards. The interface 304 may communicate with the baseband processor (i.e., the second processor 52) over a bus 305. Likewise the baseband processor may communicate with the applications processor (i.e., the first processor 22) over an interface 307.

In some embodiments of the invention, the baseband processor may interact with other components that form the subsystem components 60. In this manner, the baseband processor may communicate with a memory 308 (a flash memory or a dynamic random access memory (DRAM), as examples) that stores data and possibly instructions for the baseband processor. The baseband processor may also control a voltage controlled oscillator (VCO) 306. In this manner, the baseband processor may control the output voltage of the VCO 306 through one or more control signals 309.

The application processor communicates with several components 26 of its associated subsystem. In this manner, the components 26 may include a keypad 314 as well as a display 312. Furthermore, the application processor may communicate with a memory 310 (a flash or DRAM memory, as examples) for purposes of storing data and possibly retrieving instructions that are executed by the application processor.

Referring back to FIG. 1, in some embodiments of the invention, instead of placing both processors in their respective test modes at the same time, the control circuit 40 may alternatively stop the operations of both processors 22 and 52 at approximately the same time. In this manner, in some embodiments of the invention, the clock generator 80 generates the clock signals (that appear on at least two of the terminals 81) that are received by the first 22 and second 52 processors. The output terminal of the AND gate 124 (FIG. 2) may be coupled to the control line 79 (FIG. 1) for purposes of disabling the clock generator 80 in response to a trigger signal from one of the components of the first 20 or second 50 subsystems. Thus, in response to this trigger signal, the control circuit 40 disables, the clock generator 80 that, in turn, stops the clocked operations of the first 22 and second 52 processors at approximately the same time. Electrical power to the first 22 and second 52 processors is not removed, although the clock signals to the processors are halted. The circuit 28 may access state information (i.e. the various states of registers, etc.) of either processor 22 or 52 through a serial scan chain port of the processor, for example.

Other embodiments are within the scope of the following claims. For example, in other embodiments of the invention, a system may include more than two processors and may include more than two processor-based subsystems. In this manner, in these embodiments of the invention, the control circuit may place more than two processors in their respective test modes at approximately the same time. Alternatively, in some embodiments of the invention, the control circuit may halt the operation of more than two processors at approximately the same time. Other variations are possible.

While the present invention has been described with respect to a limited number of embodiments, those skilled in the art, having the benefit of this disclosure, will appreciate numerous modifications and variations therefrom. It is intended that the appended claims cover all such modifications and variations as fall within the true spirit and scope of this present invention.

What is claimed is:

1. A system comprising:
   a first processor comprising a first terminal, the first processor entering a first test mode in response to the first terminal having a first signal state;
   a second processor comprising a second terminal, the second processor entering a second test mode in response to the second terminal having a second signal state;
   a circuit to store a plurality of bit states to regulate the timing of the first and second signal states to place both the first processor in the first test mode and the second processor in the second test mode at approximately the same time.

2. The system of claim 1, wherein the circuit causes the first and second signal states to appear on the first and second terminals at approximately the same time.

3. The system of claim 1, further comprising a register to selectively enable the first signal state to appear on the first terminal.

4. The system of claim 3, further comprising a register to selectively enable the second signal state to appear on the second terminal.

5. A method comprising:
   providing a first processor capable of entering a first test mode;
   providing a second processor capable of entering a second test mode;
   placing both the first processor in the first test mode and the second processor in the second test mode at approximately the same time by updating one or more registers.

6. The method of claim 5, wherein the placing comprises:
   generating a first signal to appear on a first terminal of the first processor; and
   generating a second signal to appear on a second terminal of the second processor at approximately the same time that the first signal appears on the first terminal of the first processor.

7. The method of claim 5, further comprising:
   selectively enabling the first processor to respond to an external signal to enter the first test mode by updating the one or more registers.

8. The method of claim 5, further comprising:
   selectively enabling at least one of the first and second processors to trigger the first test mode or the second test mode by updating the one or more registers.

9. A system comprising:
   a first processor comprising a first terminal, the first processor entering a first test mode in response to the first terminal having a first signal state;
   a second processor comprising a second terminal, the second processor entering a second test mode in response to the second terminal having a second signal state;
   a flash memory to store data generated by at least one of the first processor and the second processor; and a circuit comprising a register to selectively enable the second signal state to appear on the second terminal.

10. The system of claim 9, wherein the circuit causes the first and second signal states to appear on the first and second terminals at approximately the same time.

11. The system of claim 9, wherein the first and second signal states appear concurrently on the first and second terminals.

12. The system of claim 9, further comprising a register to selectively enable the first signal state to appear on the first terminal.

13. A system comprising:
a baseband processor coupled to a transceiver for receiving a modulated signal; and
an applications processor coupled to the baseband processor, where both the baseband processor and the applications processor enter a test mode in response to a state of a control bit set in a register and resume normal operation in response to the state of the control bit.

14. The system of claim 13, wherein the baseband processor and the applications processor enter the test mode at substantially the same time.

15. The system of claim 13, wherein the baseband processor and the applications processor are integrated together on a common substrate and in the test mode use start and stop addresses stored in another register.

* * * * *